(12) United States Patent
Jing (10) Patent No.: US 9,652,254 B2
(45) Date of Patent: May 16, 2017

(54) SYSTEM STATUS CONTROL METHOD AND PORTABLE TERMINAL

(75) Inventor: Tao Jing, Beijing (CN)

(73) Assignees: LENOVO (BEIJING) CO., LTD., Haidian District, Beijing (CN); BEIJING LENOVO SOFTWARE LTD., Haidian District, Beijing (CN)

( * ) Notice: Subject to any disclaimer, the term of this patent is extended or adjusted under 35 U.S.C. 154(b) by 270 days.

(21) Appl. No.: 13/994,470

(22) PCT Filed: Dec. 7, 2011

(86) PCT No.: PCT/CN2011/083640
§ 371 (c)(1),
(2), (4) Date: Jun. 14, 2013

(87) PCT Pub. No.: WO2012/079484
PCT Pub. Date: Jun. 21, 2012

(65) Prior Publication Data
US 2013/0268748 A1    Oct. 10, 2013

(30) Foreign Application Priority Data
Dec. 15, 2010    (CN) .......................... 2010 1 0591149

(51) Int. Cl.
*G06F 9/44*    (2006.01)
*G06F 13/38*    (2006.01)

(52) U.S. Cl.
CPC .......... *G06F 9/4421* (2013.01); *G06F 13/385* (2013.01)

(58) Field of Classification Search
CPC .... G06F 9/44526; G06F 9/44508; G06F 8/65; G06F 9/44502; G06F 15/7867
See application file for complete search history.

(56) References Cited

U.S. PATENT DOCUMENTS 6,662,301 B1 * 12/2003 Sekine et al. ................. 713/320
6,772,354 B2 * 8/2004 Takenaka et al. ............ 713/310
(Continued)

FOREIGN PATENT DOCUMENTS

CN    1357840        7/2002
CN    1719416 A      1/2006
CN    101673174      3/2010

OTHER PUBLICATIONS

PCT/CN2011/083640 International Preliminary Report on Patentability dated Jun. 18, 2013 (20 pages).
(Continued)

*Primary Examiner* — Zahid Choudhury
(74) *Attorney, Agent, or Firm* — Brinks Gilson & Lione; G. Peter Nichols (57) ABSTRACT

A system status control method and a portable terminal are described. The portable terminal includes a first system with a first interface and a second system with a second interface, and the first system and the second system are joined or separated through the first interface and the second interface. The method includes when the first system and the second system enter a joined-up status from a separated status, the first system and the second system exchanging respective system status information thereof; and the first system and the second system control the system status according to the system status information and based on a preset policy. When a master system and a slave system are combined or separated, automatic switch control may be performed on the system status according to a usage requirement of a user and based on the preset policy.

18 Claims, 3 Drawing Sheets

(56) References Cited

U.S. PATENT DOCUMENTS

| | | | |
|---|---|---|---|
| 8,433,825 B2* | 4/2013 | Gross | 709/248 |
| 9,002,925 B2* | 4/2015 | Roper | G06F 1/1616 |
| | | | 709/203 |
| 2002/0085348 A1* | 7/2002 | Dai | G06F 1/1626 |
| | | | 361/679.29 |
| 2003/0008690 A1* | 1/2003 | Guterman | 455/574 |
| 2003/0112585 A1* | 6/2003 | Silvester | 361/679 |
| 2004/0110532 A1 | 6/2004 | Ochi et al. | |
| 2005/0116830 A1 | 6/2005 | Wallenstein | |
| 2005/0223145 A1* | 10/2005 | Lin et al. | 710/62 |
| 2006/0253668 A1* | 11/2006 | Borowski | G06F 11/2082 |
| | | | 711/162 |
| 2007/0180284 A1* | 8/2007 | Tsuji | G06F 1/3203 |
| | | | 713/323 |
| 2008/0222433 A1* | 9/2008 | Kim | 713/300 |
| 2008/0294784 A1* | 11/2008 | Wang | 709/228 |
| 2009/0077401 A1* | 3/2009 | Tsai | 713/320 |
| 2009/0177898 A1* | 7/2009 | Huang et al. | 713/300 |
| 2009/0187779 A1* | 7/2009 | Liu et al. | 713/323 |
| 2010/0023788 A1* | 1/2010 | Scott et al. | 713/320 |
| 2010/0037072 A1* | 2/2010 | Nejah | G06F 1/1632 |
| | | | 713/310 |
| 2010/0088531 A1* | 4/2010 | Gao et al. | 713/323 |
| 2010/0306501 A1* | 12/2010 | Chang | G06F 1/1654 |
| | | | 712/31 |
| 2010/0306564 A1* | 12/2010 | Kojo | 713/323 |
| 2011/0047394 A1* | 2/2011 | Sato | 713/310 |
| 2012/0151374 A1* | 6/2012 | Liu | G06F 1/3209 |
| | | | 715/740 |
| 2012/0173902 A1* | 7/2012 | Zawacki | G06F 1/1632 |
| | | | 713/320 |
| 2012/0260084 A1* | 10/2012 | Li et al. | 713/100 |
| 2013/0067262 A1* | 3/2013 | Moran | G06F 1/1616 |
| | | | 713/323 |

OTHER PUBLICATIONS

PCT/CN2011/083640 International Search Report dated Mar. 8, 2012 (4 pages including 6 page English translation).
First Office Action dated Apr. 11, 2013 from corresponding Chinese Application No. 201010591149.3 (20 pages including English translation).

* cited by examiner

SYSTEM STATUS CONTROL METHOD AND PORTABLE TERMINAL

This application claims priority to International Application No. PCT/CN2011/083640 filed Dec. 7, 2011 and to Chinese Patent Appln. No. CN201010591149.3 filed Dec. 15, 2010; the entire contents of each are incorporated herein by reference.

The present application relates to the field of communication technology, and more particularly, to a system-state control method and a portable terminal.

BACKGROUND

As for a portable terminal of hybrid system architecture, a hybrid system refers to 2 (including 2) or more systems that are combined together. For example, on the basis of an existing system, at least another system (including another PC system or an embedded system, etc.) is embedded, so that the different systems can work integrated with each other, share information and devices, and play their respective advantages. An existing common portable terminal of hybrid system architecture, usually integrates a master system or a first system (e.g., Win7) with a slave system or a second system (e.g., Android), in which the master system and the slave system can share keyboards, network cards, displays, storage devices, Audios, etc. with each other, and can implement connection and disconnection in organization and interface. When disconnected, the two systems can both work independently; when integrated, the two systems can work cooperatively. With a notebook computer as an example, usually, a display screen when disconnected is integrated on a slave system, whereas keyboard, audio, storage system, etc. when disconnected are integrated on a master system; the master system and the slave system can be combined together to work cooperatively, and also can work independently; the display screen when working independently is used by the slave system, and the display screen when working in combination can be used by either the master system or the slave system.

The inventors found in a study on an existing portable terminal of hybrid structure that, when a master system and a slave system are combined together or disconnected, if the system states of them are inconsistent, for example, when a slave system needs to be combined and work cooperatively with a master system, and if the slave system is in a work state whereas the master system is in a sleep state, then after connecting by inserting the slave system into the master system, it is still necessary for the user to manually wake up the master system, so that the cooperative work of the two systems can be implemented. As can be known from that, for an existing master system, when it is combined with or disconnected from a slave system, the two system states hardly can implement automatic switching based on a user's needs.

SUMMARY

The object of the embodiments of the present application is to provide a system-state control method and a portable terminal, to solve such a problem in the prior art that, system state can not implement automatic switching to meet actual needs of a user, when a master system and a slave system are combined or disconnected for use.

To solve the above technical problems, the embodiments of the present application provide the following technical solutions:

A system-state control method, applied in a portable terminal comprising a first system and a second system, in which the first system has a first interface and the second system has a second interface, and in which the first system and the second system implement connection or disconnection via the first interface and the second interface; the method comprises:

when the first system and the second system enter a connected state from a disconnected state, the first system and the second system interact on their respective system-state information;

the first system and the second system, based on the system-state information, perform control to the system state according to a predetermined strategy.

Said step that the first system and the second system, based on the system-state information, perform control to the system state according to a predetermined strategy, comprises:

the first system, based on its own system-state information and the system-state information of the second system, control its own system state according to a predetermined strategy; and the second system, based on its own system-state information and the system-state information of the first system, control its own system state according to a predetermined strategy.

Said step that the first system and the second system, based on the system-state information, perform control to the system state according to a predetermined strategy, comprises:

the first system, based on its own system-state information and the system-state information of the second system, control its own system state and control the system state of the second system, according to a predetermined strategy; or, the second system, based on its own system-state information and the system-state information of the first system, control its own system state and control the system state of the first system, according to a predetermined strategy.

The predetermined strategy comprises:

when the first system and the second system are in a same system state as they are in a disconnected state, then after entering a connected state, their respective system states are kept unchanged; said being in a same system state includes being simultaneously in a work state, or being simultaneously in a non-work state;

when one system from the first system and the second system is in a work state while the other system is in a non-work state as they are in a disconnected state, then after entering a connected state, the system in a non-work state enters a work state automatically.

A system-state control method, applied in a portable terminal comprising a first system and a second system, in which the first system has a first interface and the second system has a second interface, and in which the first system and the second system implement connection or disconnection via the first interface and the second interface; the method comprises:

when the first system and the second system are in a connected state with each other, the first system and the second system interact on their respective system-state information according to a preset condition;

when the first system and the second system enter a disconnected state from a connected state, the first system and the second system, based on the system-state information, perform control to the system state according to a predetermined strategy.

Said step that the first system and the second system interact on their respective system-state information according to a preset condition, comprises:

the first system and the second system interact on their respective system-state information at predefined time intervals; or the first system and the second system interact on their respective system-state information in real time; or when any one system from the first system and the second system occurs a change in its system state, a notification message containing the changed system-state information is sent to the other system.

Said step that the first system and the second system, based on the system-state information, perform control to the system state according to a predetermined strategy, comprises:

the first system, based on its own system-state information and the system-state information of the second system, control its own system state according to a predetermined strategy;

the second system, based on its own system-state information and the system-state information of the first system, control its own system state according to a predetermined strategy.

Said step that the first system and the second system, based on the system-state information, perform control to the system state according to a predetermined strategy, comprises:

the first system, based on its own system-state information, control its own system state according to a predetermined strategy;

the second system, based on its own system-state information, control its own system state according to a predetermined strategy.

The predetermined strategy comprises:

when the first system and the second system are both in a work state, then after entering a disconnected state, the first system enters a non-work state, and the second system enters a work state;

when the first system is in a non-work state, the second system is in a work state, then after entering a disconnected state, the first system will enter a work state, and the second system will enter a non-work state.

A portable terminal, comprising a first system and a second system, in which the first system has a first interface and the second system has a second interface, and in which the first system and the second system implement connection or disconnection via the first interface and the second interface, the first system is used to interact with the second system on their respective system-state information, when they enters a connected state from a disconnected state;

the second system is used to interact with the first system on their respective system-state information, when they enters a connected state from a disconnected state;

at least one system from the first system and the second system is further used to, based on the interacted system-state information, perform control to the system state according to a predetermined strategy.

The first system is specifically used to, based on its own system-state information and the system-state information of the second system, control its own system state according to a predetermined strategy;

the second system is specifically used to, based on its own system-state information and the system-state information of the first system, control its own system state according to a predetermined strategy.

The first system is specifically used to, based on its own system-state information and the system-state information of the second system, control its own system state and control the system state of the second system, according to a predetermined strategy; or, the second system is specifically used to, based on its own system-state information and the system-state information of the first system, control its own system state and control the system state of the first system, according to a predetermined strategy.

A portable terminal, comprising a first system and a second system, in which the first system has a first interface and the second system has a second interface, and in which the first system and the second system implement connection or disconnection via the first interface and the second interface, the first system is used to interact with the second system on their respective system-state information according to a preset condition, when they are in a connected state with each other;

the second system is used to interact with the first system on their respective system-state information according to a preset condition, when they are in a connected state with each other;

the first system is also used to, based on the system-state information, perform control to the system state of the first system according to a predetermined strategy, when it and the second system enter a disconnected state from a connected state;

the second system is also used to, based on the system-state information, perform control to the system state of the second system according to a predetermined strategy, when it and the first system enter a disconnected state from a connected state.

The first system is specifically used to, based on its own system-state information and the system-state information of the second system, control its own system state according to a predetermined strategy;

the second system is specifically used to, based on its own system-state information and the system-state information of the first system, control its own system state according to a predetermined strategy.

The first system is used to, based on its own system-state information, control its own system state according to a predetermined strategy;

the second system is used to, based on its own system-state information, control its own system state according to a predetermined strategy.

A portable terminal, comprising a portable mobile system which is connected with an electronic system via a connection port, further comprises:

an interaction unit, which is used to interact with the electronic system on their respective system-state information, when the portable mobile system is connected with the electronic system;

a control unit, which is used to, based on the system-state information, perform control to the system state according to a predetermined strategy.

The control unit comprises at least one of the following units:

a first control unit, which is used to, based on its own system-state information and the system-state information of the electronic system, control its own system state according to a predetermined strategy;

a second control unit, which is used to, based on its own system-state information and the system-state information of the electronic system, control its own system state and control the system state of the electronic system, according to a predetermined strategy.

The interaction unit is also used during connection of the portable mobile system with the electronic system, to interact on their respective system-state information according to a preset condition;

the control unit is also used during disconnection of the portable mobile system from the electronic system, based on the system-state information, to perform control to the system state of the portable mobile system according to a predetermined strategy.

The control unit comprises at least one of the following units:

a third control unit, which is used to, based on its own system-state information and the system-state information of the electronic system, control its own system state according to a predetermined strategy;

a fourth control unit is used to, based on its own system-state information, control its own system state according to a predetermined strategy.

As can be seen from the above technical solutions provided by the embodiments of the present application, the portable terminal in the embodiment of the present application comprises: a first system and a second system, in which the first system has a first interface and the second system has a second interface, and in which the first system and the second system implement connection or disconnection via the first interface and the second interface; when the first system and the second system enter a connected state from a disconnected state, the first system and the second system interact on their respective system-state information, moreover, the first system and the second system, based on the system-state information, perform control to the system state according to a predetermined strategy. By applying the embodiments of the present application, when a master system and a slave system are combined or disconnected, it is enabled to, based on the needs of a user, perform automatic switching control to the system state, according to a predetermined strategy; and, on the basis of switching with logic, it eliminates the need for control of the system state performed by a user via hardware switches when a master system and a slave system are combined or disconnected, thereby improving system consistency.

BRIEF DESCRIPTION OF THE DRAWINGS

In order to clearly illustrate the technical solutions of the embodiments of the invention, the accompanying drawings to be used in the description of the embodiments will be briefly introduced as below. In the following description, the accompanying drawings are merely exemplary embodiments of the present invention.

DETAILED DESCRIPTION

Among the following several embodiments of the present application, some embodiments provide a system-state control method, and some embodiments provide a portable terminal.

To make the technical solutions in the embodiments of the present application better understood by the skilled in the art, and to make the above object, features and advantages of the embodiments of the present application more apparent and understandable, below, the technical solutions in the embodiments of the present application will be described in more detail in connection with the accompanying drawings.

The embodiment of the system-state control method provided by the present application, is applied in a portable terminal comprising a first system and a second system, in which the first system has a first interface and the second system has a second interface, and in which the first system and the second system implement connection or disconnection via the first interface and the second interface. The first system of the portable terminal may specifically be a master system (also may be referred to as Base) running an X86 system, and the second system may specifically be a slave system (also may be referred to as Slate) running an ARM system; the first interface may specifically be a USB interface, also may be a UART interface or a special interface used for connection or disconnection between the two systems, meanwhile, the second interface may be a USB interface, also may be a UART interface or a special interface used for connection or disconnection between the two systems. Here it is not limited in this regard, as long as the first interface of the first system and the second interface of the second system can implement connection and disconnection of the two systems, as well as can communicate mutually on system-state information. The above-described Base and Slate are tow relatively independent systems, which can respectively work independently or can be connected to work together, and when working as connected, they can also share some of the hardware devices, for example a display device, which means, a display device, usually integrated with a slave system, can only be used by the slave system when a master system and a slave system are in disconnection (also referred to as Detach or Pull-Out), whereas can be used by the master system and also by the slave system when the master system and the slave system are in connection (also referred to as Attach or Push). In addition, the first system is a system which is constituted by a first hardware system and a first operating system based on the first hardware system, meanwhile, the second system is a system which is constituted by a second hardware system and a second operating system based on the second hardware system. The first system and the second system also may be systems which have the same operating system, for example, the first system and the second system both are systems running an X86 system, or the first system and the second system both are systems running an ARM system.

In the embodiment of the present application, no matter the master system or the slave system, their system states comprise a work state (or S0) and a non-work state, respectively; further, the non-work state can be subdivided into a sleep state (or S3) and an off state (or S4/S5). In the prior art, when a master system and a slave system enter a connected state from a disconnected state, or enter a disconnected state from a connected state, it is usually necessary for a user to trigger a change of the system state by controlling the hardware on each of the systems. In the prior art, no matter the master system or the slave system, both can not adjust the system state of its own system or adjust the system state of the other system, based on a connection relationship (i.e., connection or disconnection) between the two systems.

Figure 1:
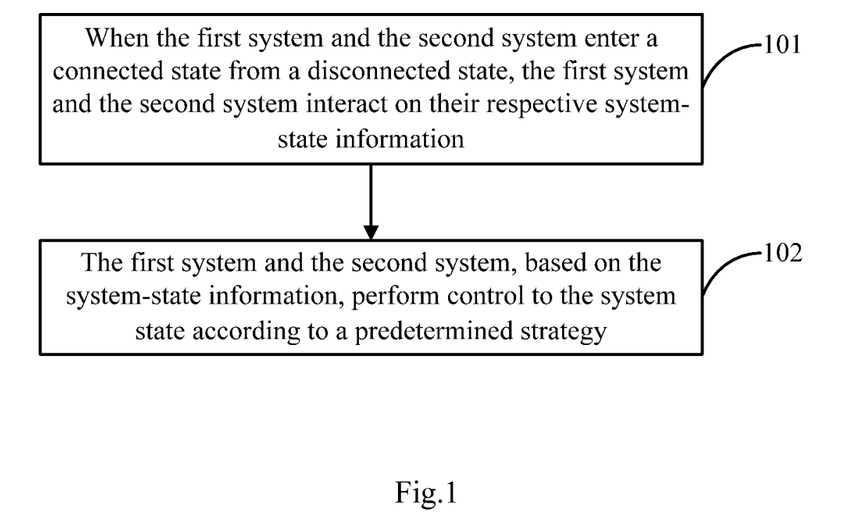
FIG. 1 is a flowchart of a first embodiment of a system-state control method provided by the present application.

Referring to FIG. 1, it is a flowchart of a first embodiment of a system-state control method provided by the present application:

Step 101: when the first system and the second system enter a connected state from a disconnected state, the first system and the second system interact on their respective system-state information.

Step 102: the first system and the second system, based on the system-state information, perform control to the system state according to a predetermined strategy.

The predetermined strategy may comprise: when the first system and the second system are in a same system state as they are in a disconnected state, then after entering a connected state, their respective system states are kept unchanged; said being in a same system state includes being simultaneously in a work state, or being simultaneously in a non-work state; when one system from the first system and the second system is in a work state while the other system is in a non-work state as they are in a disconnected state, then after entering a connected state, the system in a non-work state enters a work state automatically.

In the system-state control, there may comprise two modes as follows:

a first mode: the first system, based on its own system-state information and the system-state information of the second system, control its own system state according to a predetermined strategy; and the second system, based on its own system-state information and the system-state information of the first system, control its own system state according to a predetermined strategy.

a second mode: the first system, based on its own system-state information and the system-state information of the second system, control its own system state and control the system state of the second system, according to a predetermined strategy; or, the second system, based on its own system-state information and the system-state information of the first system, control its own system state and control the system state of the first system, according to a predetermined strategy; further, the first system also may only, based on the obtained system-state information of the second system, control the system state of the second system according to a predetermined strategy, or, the second system also may only, based on the obtained system-state information of the first system, control the system state of the first system according to a predetermined strategy.

Below, in connection with the first embodiment described above, a detailed description will given on a few examples which perform system-state control by applying the embodiment of the present application, in which the first system is a master system and the second system is a slave system, with assuming that the first system and the second system enter a connected state from a disconnected state:

1. when in a disconnected state, the master system is in state S0 and the slave system is in state S0, then after entering a connected state, the master system and the slave system both remain state S0;

2. when in a disconnected state, the master system is in state S0 and the slave system is in state S3, then after entering a connected state, the master system still remains state S0 and at the same time automatically wakes up the slave system, so that the slave system enters state S0 from state S3; according to the system-state control mode in the above-described embodiment, after the two systems are connected, the master system, based on the system state S3 of the slave system and based on its own system state S0, controls its own system state unchanged and at the same time automatically wakes up the slave system, so that the system state of the slave system occurs change and enters state S0 from state S3; of course, according to another implementation mode, after the two systems are connected, the master system, based on the system state S3 of the slave system and based on its own system state S0, controls its own system state unchanged, meanwhile, the slave system, based on the system state of the master system and its own system state, controls its own system state to change and enters state S0 from state S3. Of course, according to yet another implementation mode, the slave system, based on the system state of the master system and its own system state, controls its own system state to change and enters state S0 from state S3, and at the same time controls the master system to remain its own system state as unchanged.

3. when in a disconnected state, the master system is in state S0 and the slave system is in state S4/S5, then after entering a connected state, the master system still remains state S0 and at the same time automatically turns on the slave system, so that the slave system enters state S0 from state S4/S5; the specific implementation modes are the same as the above-described three modes, which are no more described here.

4. when in a disconnected state, the master system is in state S3 and the slave system is in state S0, then after entering a connected state, the slave system still remains state S0 and at the same time automatically wakes up the master system, so that the master system enters state S0 from state S3; the specific implementation modes are the same as the above-described three modes, which are no more described here.

5. when in a disconnected state, the master system is in state S3 and the slave system is in state S3, then after entering a connected state, the master system and the slave system both remain state S3; the specific implementation modes are the same as the above-described three modes, which are no more described here.

6. when in a disconnected state, the master system is in state S3 and the slave system is in state S4/S5, then after entering a connected state, the master system still remains state S3, and the slave system still remains state S4/S5; the specific implementation modes are the same as the above-described three modes, which are no more described here.

7. when in a disconnected state, the master system is in state S4/S5 and the slave system is in state S0, then after entering a connected state, the slave system still remains state S0 and at the same time automatically turns on the master system, so that the master system enters state S0 from state S4/S5; the specific implementation modes are the same as the above-described three modes, which are no more described here.

8. when in a disconnected state, the master system is in state S4/S5 and the slave system is in state S3, then after entering a connected state, the master system still remains state S4/S5, and the slave system still remains state S3; the specific implementation modes are the same as the above-described three modes, which are no more described here.

9. when in a disconnected state, the master system is in state S4/S5 and the slave system is in state S4/S5, then after entering a connected state, the master system and the slave system both remain state S4/S5. The specific implementation modes are the same as the above-described three modes, which are no more described here.

It should be noted that, the above are merely a few examples, which are listed for explaining the systems of the portable terminal can automatically control the state changes; in actual applications, strategies can be adjusted depending on a user's needs, and the embodiment of the present application is not limited in this regard. For example, when in a disconnected state, the master system is in state S0 and the slave system is in state S3, then after entering a connected state, the states of both the master system and the slave system are not changed.

Figure 2:
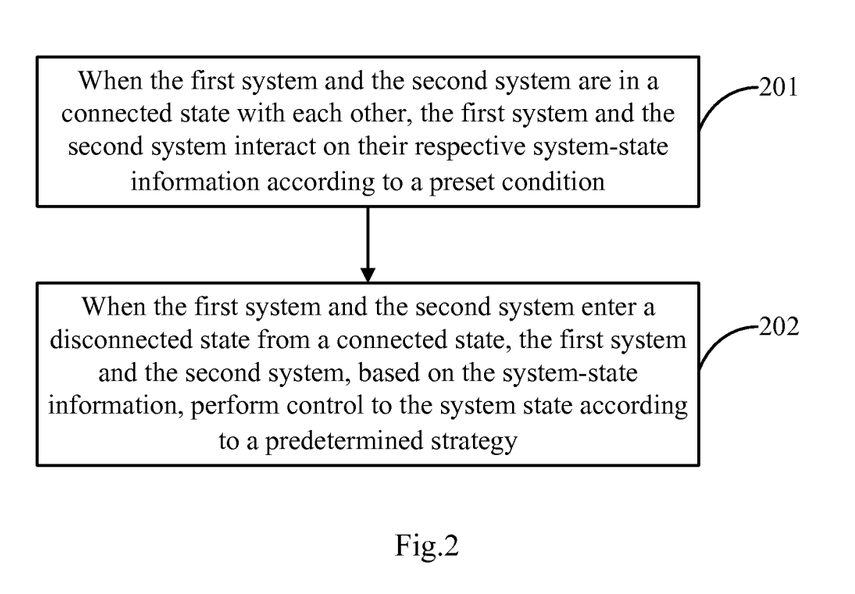
FIG. 2 is a flowchart of a second embodiment of the system-state control method provided by the present application.

Referring to FIG. 2, it is a flowchart of a second embodiment of the system-state control method provided by the present application:

Step 201: when the first system and the second system are in a connected state with each other, the first system and the second system interact on their respective system-state information according to a preset condition.

When the first system and the second system are in a connected state with each other, in order to ensure that, after entering a disconnected state, system-state control can be performed based on the original system-state information, the first system and the second system thus need to interact on their respective system-state information. The interaction on system-state information can be performed according to a preset condition, and this comprises: the first system and the second system interact on their respective system-state information at predefined time intervals; or, the first system and the second system interact on their respective system-state information in real time; or, when any one system from the first system and the second system occurs a change in its system state, a notification message containing the changed system-state information is sent to the other system.

Step 202: when the first system and the second system enter a disconnected state from a connected state, the first system and the second system, based on the system-state information, perform control to the system state according to a predetermined strategy.

The predetermined strategy may comprise: when the first system and the second system are both in a work state, then after entering a disconnected state, the first system enters a non-work state, and the second system enters a work state; when the first system is in a non-work state and the second system is in a work state, then after entering a disconnected state, the first system will enter a work state, and the second system remains its own system state. Said system state comprises a work state and a non-work state.

In the system-state control, there may comprise two modes as follows:

a first mode: the first system, based on its own system-state information and the system-state information of the second system, control its own system state according to a predetermined strategy; and the second system, based on its own system-state information and the system-state information of the first system, control its own system state according to a predetermined strategy.

a second mode: the first system, based on its own system-state information, control its own system state according to a predetermined strategy; and the second system, based on its own system-state information, control its own system state according to a predetermined strategy.

Below, in connection with the second embodiment described above, a detailed description will given on a few examples which perform system-state control by applying the embodiment of the present application, in which the first system is a master system and the second system is a slave system, with assuming that the first system and the second system enter a disconnected state from a connected state:

1. when in a connected state, the master system is in state S0 and the slave system is in state S0, then after entering a disconnected state, the master system enters state S3, and the slave system remains state S0;

2. when in a connected state, the master system is in state S0 and the slave system is in state S3, then after entering a disconnected state, the master system enters state S3 and at the same time automatically wakes up the slave system, so that the slave system enters state S0 from state S3;

3. when in a connected state, the master system is in state S0 and the slave system is in state S4/S5, then after entering a disconnected state, the master system enters state S3 and at the same time automatically turns on the slave system, so that the slave system enters state S0 from state S4/S5;

4. when in a connected state, the master system is in state S3 and the slave system is in state S0, then after entering a disconnected state, the slave system still remains state S0, and the master system still remains state S3;

5. when in a connected state, the master system is in state S3 and the slave system is in state S3, then after entering a disconnected state, the master system and the slave system both remain state S3;

6. when in a connected state, the master system is in state S3 and the slave system is in state S4/S5, then after entering a disconnected state, the master system still remains state S3, and the slave system still remains state S4/S5;

7. when in a connected state, the master system is in state S4/S5 and the slave system is in state S0, then after entering a disconnected state, the slave system still remains state S0, and the master system remains state S4/S5;

8. when in a connected state, the master system is in state S4/S5 and the slave system is in state S3, then after entering a disconnected state, the master system still remains state S4/S5, and the slave system still remains state S3;

9. when in a connected state, the master system is in state S4/S5 and the slave system is in state S4/S5, then after entering a disconnected state, the master system and the slave system both remain state S4/S5.

It should be noted that, the above are merely a few examples, which are listed for explaining the systems of the portable terminal can automatically control the state changes; in actual applications, strategies can be adjusted depending on a user's needs, and the embodiment of the present application is not limited in this regard. For example, when in a connected state, the master system is in state S0 and the slave system is in state S3, then after entering a disconnected state, the states of both the master system and the slave system are not changed.

As can be seen from the above embodiments, compared to the case of the prior art where a user needs to control a system-state change via a switch Power Button of the hardware system when a connected state between a master system and a slave system is changed, the present application actually adds a new triggering mechanism for a state change, e.g., the slave system is inserted into the master system or pulled out from the master system, and the triggering performs automatic system-state control; the specific controlling process may be implemented based on the system-state information of the two systems in accordance with the description of the aforementioned embodiments.

Figure 3:
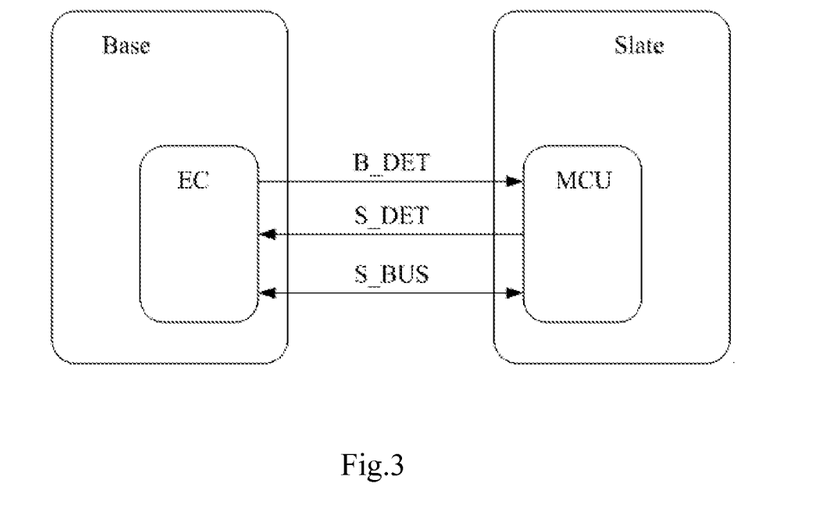
FIG. 3 is a schematic structural diagram of a portable terminal which performs system control by applying the system-state control method provided by the present application.

Referring to FIG. 3, it is a schematic structural diagram of a portable terminal which performs system control by applying the system-state control method provided by the present application:

Base is used as a master system which comprises an embedded controller EC, and Slate is used as a slave system which comprises a micro control unit MCU; on the EC and the MCU, there are provided with a physical interface respectively, and corresponding detection and communication channels are added to the physical interfaces. As shown in FIG. 3, B_DET is used to transmit first signals of Base from the EC to the MCU, and when the master system and the slave system are connected, B_DET corresponds to the detection channel of the MCU, thus Slate can detect whether Base exists based on the first signals; S_DET is used to transmit second signals of Slate from the MCU to the EC, and when the master system and the slave system are connected, S_DET corresponds to the detection channel of the EC, thus Base can detect whether Slate exists based on the second signals; S_BUS is a serial communication bus, such as I2C (Inter-Integrated Circuit), SPI (Serial Peripheral Interface), UART (Universal Asynchronous Receiver/Transmitter), etc., in which there contains necessary interrupt-lines for transmitting system states of Base and Slate between the EC and the MCU. When the master system and the slave system are connected, S_BUS constitutes a communication channel between the master system and the slave system. Furthermore, B_DET, detection channel and S_BUS can be used as at least part of the first interface of the master system. S_DET, detection channel and S_BUS can be used as at least part of the second interface of the slave system.

In connection with FIG. 3, it is assumed that when Base and Slate are in a disconnected state, the system state of Base is S3, and the system state of Slate is S0. After Slate is inserted into Base, the EC of Base detects a change in S_DET and thereby determines the event that Slate is inserted into Base. At this point, the EC of Base communicates via S_BUS with the MCU of Slate, and obtains that the system state of Slate is S0 while the system state of Base is S3; thus, based on the aforementioned predetermined control strategy, Base is automatically woken up and enters S0 state, whereas Slate remains state S0.

A typical application scenario in connection with the above embodiment is as follows: when Base and Slate are disconnected, Base is in state S3 and Slate is in state S0, that is, a user has been using Slate alone all the time, then when the user wants to connect Slate onto Base for charging or wants to copy a file, Slate needs to be inserted into Base. In the prior art, in this case, the user needs to again manually press the hardware switch of Base, or to turn on the hardware switch LID to wake up Base; in contrast, by using the embodiment of the present application, it is possible to automatically turn on Base, based on a preset corresponding relationship between the system-state information and the state-control information, thereby eliminating a user's manual operation and bringing consistency of accustomation.

In addition, there is another application in the prior art: when the first system and the second system are a Notebook (Tablet PC) and a Dock (a system for docking and undocking the Notebook), respectively, then, it is possible to set corresponding actions for a system-state change through a specific program when the two systems are in docking and undocking, and the docking and undocking actions are similar to the inserting and ejection actions of Base and Slate in the aforementioned application. However, since docking/undocking of Dock is essentially an action similar to interaction between a device and a system, in which the device itself does not have such a property as a system state, so the docking/undocking event is still a property similar to a hardware switch. In contrast, in the embodiments of the present application, it is such an interaction that occurs between two systems which both have multiple system states, and a system-state change is not only related to insertion and ejection operations, but also are further related to the system states of the two systems themselves; therefore, it provides consistency and integration which the prior art does not have.

Corresponding to the display control method of a portable terminal provided by the present application, the present application also provides an embodiment of the portable terminal.

Figure 4:
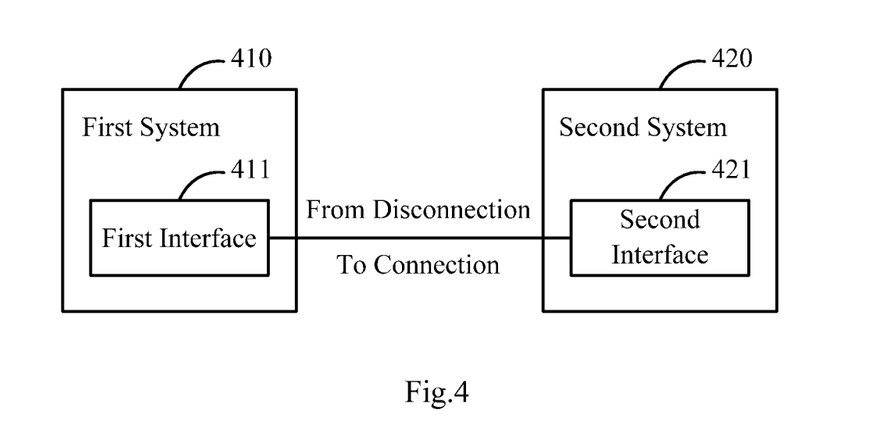
FIG. 4 is a block diagram of a first embodiment of a portable terminal provided by the present application.

Referring to FIG. 4, it is a block diagram of a first embodiment of the portable terminal provided by the present application; the portable terminal in the embodiment is such a portable terminal that the tow systems thereof enter a connected state from a disconnected state.

The portable terminal comprises: a first system 410 and a second system 420. The first system 410 has a first interface 411, and the second system 420 has a second interface 421; the first system 410 and the second system 420 implement connection or disconnection via the first interface 411 and the second interface 422.

The first system 410 is used to interact with the second system 420 on their respective system-state information, when they enter a connected state from a disconnected state;

the second system 420 is used to interact with the first system 410 on their respective system-state information, when they enters a connected state from a disconnected state;

at least one system from the first system 410 and the second system 420 is further used to, based on the interacted system-state information, perform control to the system state according to a predetermined strategy.

The first system 410 is specifically used to, based on its own system-state information and the system-state information of the second system 420, control its own system state according to a predetermined strategy; the second system 420 is specifically used to, based on its own system-state information and the system-state information of the first system 410, control its own system state according to a predetermined strategy.

The first system 410 is specifically used to, based on its own system-state information and the system-state information of the second system 420, control its own system state and control the system state of the second system 420, according to a predetermined strategy; or, the second system 420 is specifically used to, based on its own system-state information and the system-state information of the first system 410, control its own system state and control the system state of the first system 410, according to a predetermined strategy.

Figure 5:
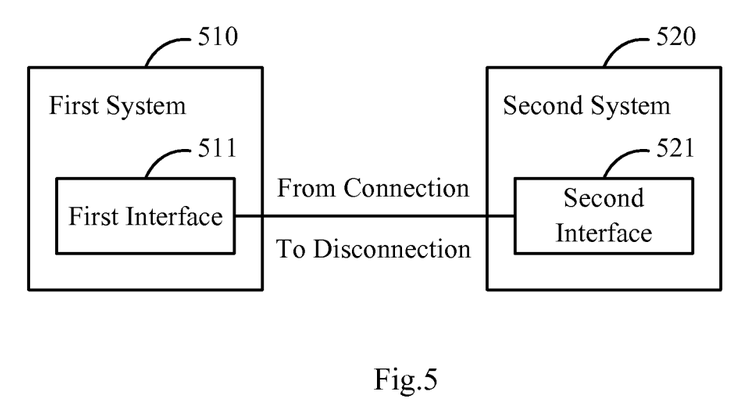
FIG. 5 is a block diagram of a second embodiment of the portable terminal provided by the present application.

Referring to FIG. 5, it is a block diagram of a second embodiment of the portable terminal provided by the present application; the portable terminal in the embodiment is such a portable terminal that the tow systems thereof enter a disconnected state from a connected state.

The portable terminal comprises: a first system 510 and a second system 520. The first system 510 has a first interface 511, and the second system 520 has a second interface 521; the first system 510 and the second system 520 implement connection or disconnection via the first interface 511 and the second interface 522.

The first system 510 is used to interact with the second system 520 on their respective system-state information according to a preset condition, when they are in a connected state with each other;

the second system 520 is used to interact with the first system 510 on their respective system-state information according to a preset condition, when they are in a connected state with each other;

the first system 510 is also used to, based on the system-state information, perform control to the system state of the first system 510 according to a predetermined strategy, when it and the second system 520 enter a disconnected state from a connected state;

the second system 520 is also used to, based on the system-state information, perform control to the system state of the second system 520 according to a predetermined strategy, when it and the first system 510 enter a disconnected state from a connected state.

The first system 510 is specifically used to, based on its own system-state information and the system-state information of the second system 520, control its own system state according to a predetermined strategy; the second system 520 is specifically used to, based on its own system-state information and the system-state information of the first system 510, control its own system state according to a predetermined strategy.

The first system 510 is used to, based on its own system-state information, control its own system state according to a predetermined strategy; the second system 520 is used to, based on its own system-state information, control its own system state according to a predetermined strategy.

Figure 6:
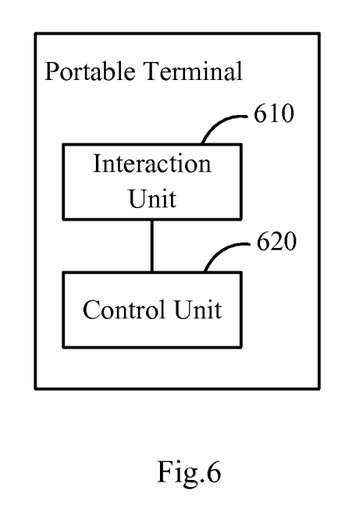
FIG. 6 is a block diagram of a third embodiment of the portable terminal provided by the present application.

Referring to FIG. 6, it is a block diagram of a third embodiment of the portable terminal provided by the present application; the portable terminal comprises a portable mobile system which is connected with an electronic system via a connection port.

The portable terminal further comprises: an interaction unit 610 and a control unit 620.

The interaction unit 610 is used to interact with the electronic system on their respective system-state information, when the portable mobile system is connected with the electronic system;

The control unit 620 is used to, based on the system-state information, perform control to the system state according to a predetermined strategy.

Specifically, the interaction unit 610 comprises at least one of the following units (not shown in FIG. 6): a first control unit, which is used to, based on its own system-state information and the system-state information of the electronic system, control its own system state according to a predetermined strategy; a second control unit, which is used to, based on its own system-state information and the system-state information of the electronic system, control its own system state and control the system state of the electronic system, according to a predetermined strategy.

The interaction unit 610 is also used during connection of the portable mobile system with the electronic system, to interact on their respective system-state information according to a preset condition; the control unit 620 is also used during disconnection of the portable mobile system from the electronic system, based on the system-state information, to perform control to the system state of the portable mobile system according to a predetermined strategy.

Specifically, the control unit 620 also may further comprise at least one of the following units (not shown in FIG. 6): a third control unit, which is used to, based on its own system-state information and the system-state information of the electronic system, control its own system state according to a predetermined strategy; a fourth control unit is used to, based on its own system-state information, control its own system state according to a predetermined strategy.

As can be seen from the above description of the implementation, the portable terminal in the embodiment of the present application comprises: a first system and a second system, in which the first system has a first interface and the second system has a second interface, and in which the first system and the second system implement connection or disconnection via the first interface and the second interface; when the first system and the second system enter a connected state from a disconnected state, the first system and the second system interact on their respective system-state information, moreover, the first system and the second system, based on the system-state information, perform control to the system state according to a predetermined strategy. By applying the embodiments of the present application, when a master system and a slave system are combined or disconnected, it is enabled to, based on the needs of a user, perform automatic switching control to the system state, according to a predetermined strategy; and, on the basis of switching with logic, it eliminates the need for control of the system state performed by a user via hardware switches when a master system and a slave system are combined or disconnected, thereby improving system consistency.

It can be appreciated by those skilled in the art that, the techniques in the embodiments of the present application can be implemented by means of software plus necessary general-purpose hardware platform. In view of this, the technical solutions in the embodiments of the present application, or in other words a part thereof which makes contribution over the prior art, can be substantially embodied in form of a software product. The computer software product can be stored in a storage media, such as ROM/RAM, magnetic disk, optical disc and the like, containing instructions which cause a computer system (which can be a personal computer, a server, a network device or the like) to perform one or more methods according to the embodiments of the present application or particular parts thereof.

The embodiments in the specification are described in a progressive manner; the same or similar elements of the respective embodiments may refer to each other; the description of any embodiment focuses on the difference compared with other embodiments. In particular, for the embodiments of systems, their description is relatively simple, as they are substantially similar to the embodiments of methods, and thus, some relevant parts may refer to the corresponding description of the embodiments of methods.

The embodiments of the present application as described above do not limit the scope of the present application which should encompass all variations, equivalents and modifications that fall within the principle and spirit of the present application.

What is claimed is:

1. A system-state control method, applied in a portable terminal comprising a first system and a second system, in which the first system has a first interface and the second system has a second interface, and in which the first system and the second system implement connection or disconnection via the first interface and the second interface, the method comprises:

when the first system and the second system enter a connected state from a disconnected state, the first system and the second system interact on their respective system-state information;

the first system and the second system, based on the system-state information, perform control to the system state according to a predetermined strategy, wherein the first system is a system which is constituted by a first hardware system and a first operating system based on the first hardware system, the second system is a system which is constituted by a second hardware system and a second operating system based on the second hardware system, and when the first system and the second system are connected, the first system and the second system share some hardware devices, the second hardware system includes a display screen, when the first system and the second system are disconnected, the display screen is used by the second system, when the first system and the second system are connected with each other, the display screen is used by the first system, wherein the predetermined strategy comprises when the first system and the second system are in a same system state as they are in a disconnected state, then after entering a connected state, their respective system states are kept unchanged; said being in a same system state includes being simultaneously in a work state, or being simultaneously in a non-work state;

when one system from the first system and the second system is in a work state while the other system is in a non-work state as they are in a disconnected state, then after entering a connected state, the system in a non-work state enters a work state automatically.

2. The method according to claim 1, wherein said step that the first system and the second system, based on the system-state information, perform control to the system state according to a predetermined strategy, comprises:

the first system, based on its own system-state information and the system-state information of the second system, control its own system state according to a predetermined strategy; and the second system, based on its own system-state information and the system-state information of the first system, control its own system state according to a predetermined strategy.

3. The method according to claim 1, wherein said step that the first system and the second system, based on the system-state information, perform control to the system state according to a predetermined strategy, comprises:

the first system, based on its own system-state information and the system-state information of the second system, control its own system state and control the system state of the second system, according to a predetermined strategy; or, the second system, based on its own system-state information and the system-state information of the first system, control its own system state and control the system state of the first system, according to a predetermined strategy.

4. A system-state control method, applied in a portable terminal comprising a first system and a second system, in which the first system has a first interface and the second system has a second interface, and in which the first system and the second system implement connection or disconnection via the first interface and the second interface, wherein the method comprises:

when the first system and the second system are in a connected state with each other, the first system and the second system interact on their respective system-state information according to a preset condition;

when the first system and the second system enter a disconnected state from a connected state, the first system and the second system, based on the system-state information, perform control to the system state according to a predetermined strategy, wherein the first system is a system which is constituted by a first hardware system and a first operating system based on the first hardware system, the second system is a system which is constituted by a second hardware system and a second operating system based on the second hardware system, and when the first system and the second system are connected, the first system and the second system share some hardware devices, the second hardware system includes a display screen, when the first system and the second system are disconnected, the display screen is used by the second system, when the first system and the second system are connected with each other, the display screen is used by the first system, wherein the predetermined strategy comprises when the first system and the second system are in a same system state as they are in a disconnected state, then after entering a connected state, their respective system states are kept unchanged; said being in a same system state includes being simultaneously in a work state, or being simultaneously in a non-work state;

when one system from the first system and the second system is in a work state while the other system is in a non-work state as they are in a disconnected state, then after entering a connected state, the system in a non-work state enters a work state automatically.

5. The method according to claim 4, wherein said step that the first system and the second system interact on their respective system-state information according to a preset condition, comprises:

the first system and the second system interact on their respective system-state information at predefined time intervals; or the first system and the second system interact on their respective system-state information in real time; or when any one system from the first system and the second system occurs a change in its system state, a notification message containing the changed system-state information is sent to the other system.

6. The method according to claim 4, wherein said step that the first system and the second system, based on the system-state information, perform control to the system state according to a predetermined strategy, comprises:

the first system, based on its own system-state information and the system-state information of the second system, control its own system state according to a predetermined strategy;

the second system, based on its own system-state information and the system-state information of the first system, control its own system state according to a predetermined strategy.

7. The method according to claim 4, wherein said step that the first system and the second system, based on the system-state information, perform control to the system state according to a predetermined strategy, comprises:

the first system, based on its own system-state information, control its own system state according to a predetermined strategy;

the second system, based on its own system-state information, control its own system state according to a predetermined strategy.

8. The method according to claim 4, wherein the predetermined strategy comprises:

when the first system and the second system are both in a work state, then after entering a disconnected state, the first system enters a non-work state, and the second system enters a work state;

when the first system is in a non-work state, the second system is in a work state, then after entering a disconnected state, the first system will enter a work state, and the second system will enter a non-work state.

9. A portable terminal, comprising a first system and a second system, in which the first system has a first interface and the second system has a second interface, and in which the first system and the second system implement connection or disconnection via the first interface and the second interface, wherein the first system is used to interact with the second system on their respective system-state information, when they enter a connected state from a disconnected state;

the second system is used to interact with the first system on their respective system-state information, when they enter a connected state from a disconnected state;

at least one system from the first system and the second system is further used to, based on the interacted system-state information, perform control to the system state according to a predetermined strategy, wherein the first system is a system which is constituted by a first hardware system and a first operating system based on the first hardware system, the second system is a system which is constituted by a second hardware system and a second operating system based on the second hardware system, and when the first system and the second system are connected, the first system and the second system share some hardware devices, the second hardware system includes a display screen, when the first system and the second system are disconnected, the display screen is used by the second system, when the first system and the second system are connected with each other, the display screen is used by the first system, wherein the predetermined strategy comprises when the first system and the second system are in a same system state as they are in a disconnected state, then after entering a connected state, their respective system states are kept unchanged; said being in a same system state includes being simultaneously in a work state, or being simultaneously in a non-work state;

when one system from the first system and the second system is in a work state while the other system is in a non-work state as they are in a disconnected state, then after entering a connected state, the system in a non-work state enters a work state automatically.

10. A portable terminal according to claim 9, wherein the first system is specifically used to, based on its own system-state information and the system-state information of the second system, control its own system state according to a predetermined strategy;

the second system is specifically used to, based on its own system-state information and the system-state information of the first system, control its own system state according to a predetermined strategy.

11. A portable terminal according to claim 9, wherein the first system is specifically used to, based on its own system-state information and the system-state information of the second system, control its own system state and control the system state of the second system, according to a predetermined strategy; or the second system is specifically used to, based on its own system-state information and the system-state information of the first system, control its own system state and control the system state of the first system, according to a predetermined strategy.

12. A portable terminal, comprising a first system and a second system, in which the first system has a first interface and the second system has a second interface, and in which the first system and the second system implement connection or disconnection via the first interface and the second interface, wherein the first system is used to interact with the second system on their respective system-state information according to a preset condition, when they are in a connected state with each other;

the second system is used to interact with the first system on their respective system-state information according to a preset condition, when they are in a connected state with each other;

the first system is also used to, based on the system-state information, perform control to the system state of the first system according to a predetermined strategy, when it and the second system enter a disconnected state from a connected state;

the second system is also used to, based on the system-state information, perform control to the system state of the second system according to a predetermined strategy, when it and the first system enter a disconnected state from a connected state, wherein the first system is a system which is constituted by a first hardware system and a first operating system based on the first hardware system, the second system is a system which is constituted by a second hardware system and a second operating system based on the second hardware system, and when the first system and the second system are connected, the first system and the second system share some hardware devices, the second hardware system includes a display screen, when the first system and the second system are disconnected, the display screen is used by the second system, when the first system and the second system are connected with each other, the display screen is used by the first system, wherein the predetermined strategy comprises when the first system and the second system are in a same system state as they are in a disconnected state, then after entering a connected state, their respective system states are kept unchanged; said being in a same system state includes being simultaneously in a work state, or being simultaneously in a non-work state;

when one system from the first system and the second system is in a work state while the other system is in a non-work state as they are in a disconnected state, then after entering a connected state, the system in a non-work state enters a work state automatically.

13. A portable terminal according to claim 12, wherein the first system is specifically used to, based on its own system-state information and the system-state information of the second system, control its own system state according to a predetermined strategy;

the second system is specifically used to, based on its own system-state information and the system-state information of the first system, control its own system state according to a predetermined strategy.

14. A portable terminal according to claim 12, wherein
the first system is used to, based on its own system-state information, control its own system state according to a predetermined strategy;
the second system is used to, based on its own system-state information, control its own system state according to a predetermined strategy.

15. A portable terminal, comprising a portable mobile system which is connected with an electronic system via a connection port, wherein it further comprises:
an interaction unit, which is used to interact with the electronic system on their respective system-state information, when the portable mobile system is connected with the electronic system;
a control unit, which is used to, based on the system-state information, perform control to the system state according to a predetermined strategy, wherein
the portable mobile system is a system which is constituted by a first hardware system and a first operating system based on the first hardware system,
the electronic system is a system which is constituted by a second hardware system and a second operating system based on the second hardware system, and
when the portable mobile system and the electronic system are connected, the portable mobile system and the electronic system share some hardware devices,
the second hardware system includes a display screen,
when the first system and the second system are disconnected, the display screen is used by the second system,
when the first system and the second system are connected with each other, the display screen is used by the first system,
wherein the predetermined strategy comprises when the first system and the second system are in a same system state as they are in a disconnected state, then after entering a connected state, their respective system states are kept unchanged; said being in a same system state includes being simultaneously in a work state, or being simultaneously in a non-work state;
when one system from the first system and the second system is in a work state while the other system is in a non-work state as they are in a disconnected state, then after entering a connected state, the system in a non-work state enters a work state automatically.

16. A portable terminal according to claim 15, wherein the control unit comprises at least one of the following units:
a first control unit, which is used to, based on its own system-state information and the system-state information of the electronic system, control its own system state according to a predetermined strategy;
a second control unit, which is used to, based on its own system-state information and the system-state information of the electronic system, control its own system state and control the system state of the electronic system, according to a predetermined strategy.

17. A portable terminal according to claim 16, wherein
the interaction unit is also used during connection of the portable mobile system with the electronic system, to interact on their respective system-state information according to a preset condition;
the control unit is also used during disconnection of the portable mobile system from the electronic system, based on the system-state information, to perform control to the system state of the portable mobile system according to a predetermined strategy.

18. A portable terminal according to claim 17, wherein the control unit comprises at least one of the following units:
a third control unit, which is used to, based on its own system-state information and the system-state information of the electronic system, control its own system state according to a predetermined strategy;
a fourth control unit, which is used to, based on its own system-state information, control its own system state according to a predetermined strategy.

* * * * *